(12) United States Patent
Rodrigues Rosa Junior

(10) Patent No.: US 10,922,213 B2
(45) Date of Patent: Feb. 16, 2021

(54) EMBEDDED QUALITY INDICATION DATA FOR VERSION CONTROL SYSTEMS

(71) Applicant: Red Hat, Inc., Raleigh, NC (US)

(72) Inventor: Cleber Rodrigues Rosa Junior, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/425,442

(22) Filed: May 29, 2019

(65) Prior Publication Data

US 2020/0379880 A1    Dec. 3, 2020

(51) Int. Cl.
*G06F 9/44* (2018.01)
*G06F 11/36* (2006.01)

(52) U.S. Cl.
CPC ........ *G06F 11/368* (2013.01); *G06F 11/3616* (2013.01); *G06F 11/3688* (2013.01)

(58) Field of Classification Search
CPC . G06F 11/368; G06F 11/3616; G06F 11/3688
See application file for complete search history.

(56) References Cited

U.S. PATENT DOCUMENTS

| 9,632,771 | B2 | 4/2017 | Toub | |
|---|---|---|---|---|
| 10,223,658 | B2 | 3/2019 | Cornilescu | |
| 2005/0055686 | A1* | 3/2005 | Buban | G06F 8/62 |
| | | | | 717/170 |
| 2007/0240116 | A1* | 10/2007 | Bangel | G06F 11/3664 |
| | | | | 717/124 |
| 2011/0083122 | A1* | 4/2011 | Chen | G06F 11/3668 |
| | | | | 717/124 |
| 2013/0332905 | A1* | 12/2013 | Vikutan | G06F 11/3684 |
| | | | | 717/124 |
| 2016/0299835 | A1* | 10/2016 | Jain | G06F 11/3676 |
| 2017/0372247 | A1 | 12/2017 | Tauber et al. | |
| 2018/0089066 | A1* | 3/2018 | Barnett | G06F 11/3664 |
| 2019/0205112 | A1* | 7/2019 | Salameh | G06F 8/65 |
| 2020/0125485 | A1* | 4/2020 | Wiener | G06F 8/71 |

FOREIGN PATENT DOCUMENTS

| CN | 103309804 | 9/2013 |
|---|---|---|
| CN | 103793315 | 5/2014 |

OTHER PUBLICATIONS

Krusche, et al., "Teaching Code Review Management using Branch Based Workflows", May 2016, Germany, https://ase.in.tum.de/lehrstuhl_1/research/paper/krusche2016codereview.pdf, 10 pages.

Rajashekaraiah, Ankur KishoreManoj, "A Structured Approach to Embedded Software Source Control", Nov. 2, 2015, https://www.edn.com/print/4440741, 3 pages.

* cited by examiner

*Primary Examiner* — Adam Lee
(74) *Attorney, Agent, or Firm* — Lowenstein Sandler LLP

(57) ABSTRACT

Disclosed herein is technology to store test data and associate the test data with a change set in a version control system. An example method may include: accessing a code object in a version data store, wherein the version data store comprises a change set applied to the code object; initiating a test of the code object; accessing test data for the code object, wherein the test data comprises output of the test; storing the test data in the version data store; and associating the change set with the test data in the version data store.

16 Claims, 8 Drawing Sheets

US 10,922,213 B2

EMBEDDED QUALITY INDICATION DATA FOR VERSION CONTROL SYSTEMS

TECHNICAL FIELD

The present disclosure is generally related to version control systems, and is more specifically related to associating test data with change sets in the version control system.

BACKGROUND

Version control systems store and manage multiple versions of an object. Each version may include one or more modifications that are absent from a prior or subsequent version. The version control system may organize the versions of the object using version identifiers and may enable particular versions to be accessed and tested.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
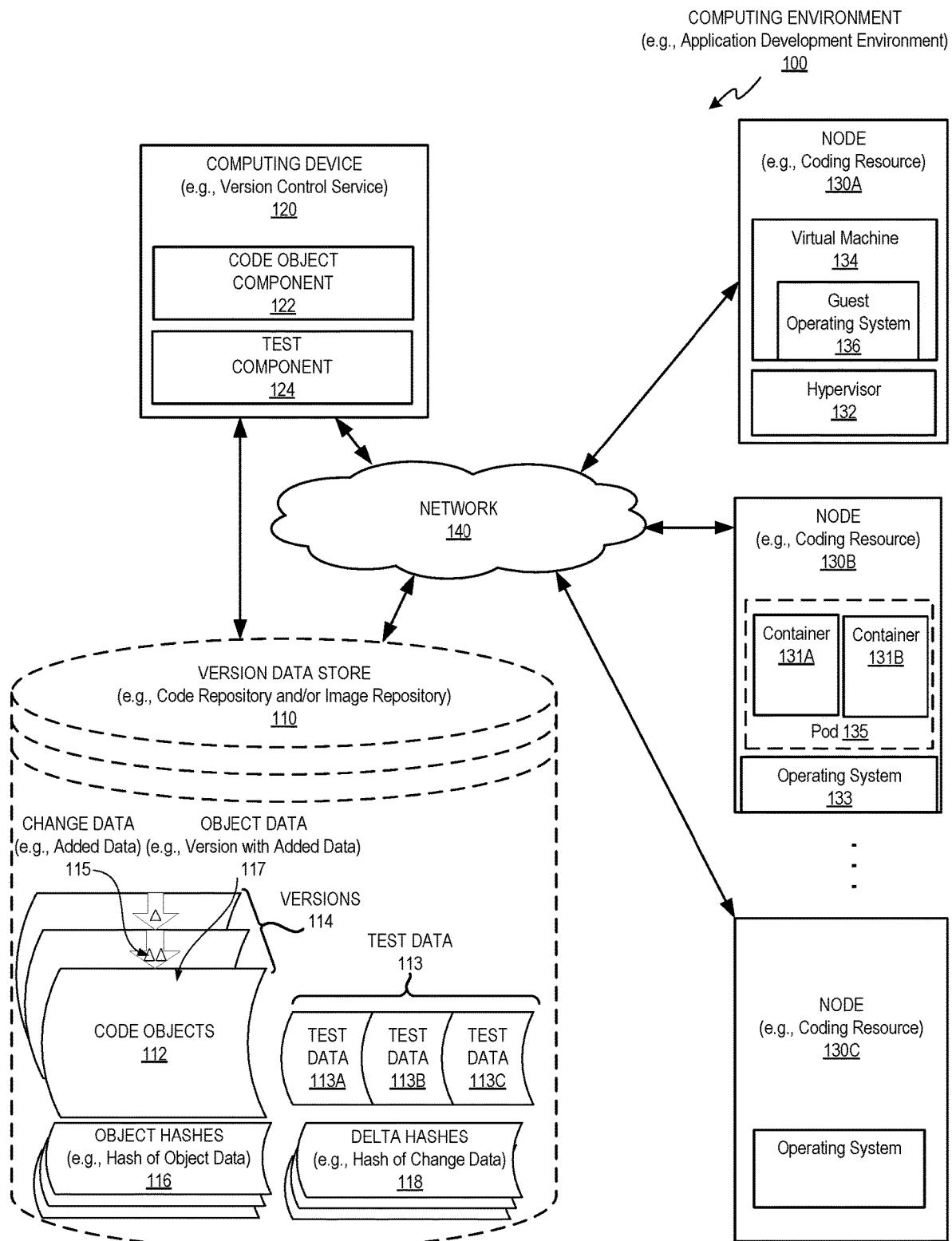
FIG. 1 depicts a high-level block diagram of an example computing environment, in accordance with one or more aspects of the present disclosure.

Modern version control systems store multiple versions of a code object and enable a version to be accessed, changed, and tested in isolation from other versions of the code object. The changes made to a first version may not affect other versions until the changes are integrated into the other versions. It is a common practice to run tests on a version of the code object before, during, or after the integration to minimize introducing new defects. The tests are resource intensive and produce results that are often discarded after determining the test is satisfied. The changes being tested are initially made in isolation and are subsequently integrated into other versions as the changes are delivered upstream. As a result, the same tests may be run on the same changes and each time the test results may be subsequently discarded.

Aspects of the present disclosure address the above and other deficiencies by providing technology that stores test data in a versions control system and associates the test data with a corresponding change. The test data may include the output of a test (e.g., pass/fail results, log file), input for the test (e.g., check command, test configuration data), other data, or a combination thereof. In one example, the technology disclosed herein may access a code object in a version data store. The code object may include source code, a text document, a settings file, an executable image, other data, or a combination thereof. The code object may be modified by a change set that includes one or more changes to content of the code object. The version data store may store the change set and also store one or more versions of the code object that are created when applying the change set. The technology may initiate a test of a version of the code object that includes the change set and then access test data that includes output of the test. The technology may store the test data in the version data store and associate the test data with the change set.

The systems and methods described herein include technology that enhances the computing field of version control systems by integrating test data with change sets. In particular, aspects of the present disclosure may enable changes to a code object to be tested in a more comprehensive and resource efficient manner. As discussed above, a particular change set may be incorporated into multiple different versions of a code object as it is delivered between branches. The same tests are typically run on each new version and therefor the same change set will be repeatedly tested. The technology disclosed herein may avoid duplicative tests by storing the test data in the version data store and associating the test data with the change set. Storing the test data may enable a device to verify that the change set was previously tested and to select a different test configuration to test the new version that includes the same change set. This may enable the same identical change set (e.g., bug fix, performance enhancement) to be tested using alternate test configurations instead of duplicative test configurations. Associating the test data with the change set may also enable other users to more easily access the test data earlier in the development lifecycle. The test data may indicate quality concerns that can be addressed during subsequent development and/or testing.

Various aspects of the above referenced methods and systems are described in details herein below by way of examples, rather than by way of limitation. The examples provided below discuss a computing object that may be a single source code file, settings file, or image file. In other examples, the code object may be a set of code objects and a version of the set may correspond to respective versions of each code object in the set, as discussed in more detail in regards to FIG. 3.

FIG. 1 illustrates an exemplary computing environment 100 in which implementations of the disclosure may operate. Computing environment 100 may provide a development environment or a production environment and may enable a user to develop, configure, test, and deploy programs. In one example, computing environment 100 may be a web-based or non-web-based development platform and may be the same or similar to RedHat® OpenShift®, Microsoft® Azure Devops®, Oracle® Application Express® (APEX), other development platform, or a combination thereof. In another example, computing environment 100 may include separate tools that may or may not be arranged or organized as an Integrated Development Environment (IDE). In either example, computing environment 100 may include a version data store 110, a computing device 120, a plurality of nodes 130A-C, and a network 140.

Version data store 110 may be a data store that stores one or more code objects 112 and each of the code objects 112 may include one or more versions 114. Version data store 110 may be referred to as a source code repository, a program repository, a package repository, an image repository, a document repository, other repository, or a combination thereof. Version data store 110 may include a single data storage device or multiple storage devices and may store data as one or more file system objects (e.g., files, directories), database objects (e.g., records), data blobs (e.g., continuous or non-continuous bit series), other data storage objects, or a combination thereof.

Version data store 110 may be a decentralized data store, a centralized data store, or a combination thereof. In the example shown in FIG. 1, version data store 110 may be a centralized content store that provides centralized access to code objects 112 and test data 113. In another example (not shown), version data store 110 may be a decentralized content store that distributes code objects 112 and test data 113 across one or more storage devices (e.g., multiple heterogeneous or homogenous nodes). In either example, the version data store 110 may provide access to one or more code objects 112.

Code objects 112 may be data structures that function as storage objects for object data. The storage objects may be in the form of file system objects (e.g., files, directories), database objects (e.g., records, tables, tuples, value pairs), other data storage structures, or a combination thereof. Each of code objects 112 may include object data that may be in a human readable form, a non-human readable form, or a combination thereof. Object data of a code object may or may not be separated into object content and object metadata. The object metadata may provide descriptive information about the object content and may include an object name (e.g., version identifier, object identifier), date (e.g., object creation date), user information (e.g., object or version creator, modifier), other descriptive information, or a combination thereof. In the example shown in FIG. 1, a version of the code object 112 may include object data 117.

Object data 117 of a code object may include source code data, executable code data, settings data, other data, or a combination thereof. The source code data may include a collection of words in a human-readable programming language that can be transformed from text (e.g., source code) into executable code for execution by a computing device. Source code data may be transformed by an assembler, compiler, linker, interpreter, other coding resource, or a combination thereof. The executable code data may include machine code that can be directly or indirectly executed by a processor of a computing device. The executable code data may include program data (e.g., executable or library), package data (e.g., an installation file), executable image data (e.g., virtual machine image, container image, or hard disk image), other data, or a combination thereof. The settings data may include customizable settings that effect source code or executable code. The settings data may be in the form of a file (e.g., settings file), a database (e.g., registry entry), other form, or a combination thereof. A code object may include any type of object data 117 and may be associated with test data 113.

Test data 113 may relate to one or more tests of a code object. A test may include one or more operations for assessing a code object. The test may be performed on content of the code object or on output of one or more transformations of the code object (e.g., an executable derived from source code). A test may be the same or similar to an assessment, an examination, a check, other term, or a combination thereof. A code object may be tested using one or more operations that include spell checking, syntax checking, compiling, linking, building, packaging, executing, running, launching, initiating, instantiating, deploying, other operation, or a combination thereof.

Test data 113 may be a data structure that stores and organizes output data of a test, input data of a test, other data, or a combination thereof. The data structure may include one or more data storage objects (e.g., file, database record) and may be associated with or correspond to multiple versions in version data store 110. The output data may be test results and may be generated by the computing device executing the test or the computing device managing the execution of the test. The output data may include execution data generated by the running the test and status data that is generated in view of the execution data. For example, the execution data may include a series of events that are generated and recorded (e.g., logged) during the test and the status data may indicate whether the events correspond to a pass or fail status. The status may function as a test summary of the execution data and may be incorporated into a report to indicate a portion of a test passed (e.g., satisfied a threshold), failed (e.g., failed to satisfy a threshold), or a combination thereof. The execution data and status data may be generated before, during, or after the test is run.

Test data 113 may also or alternatively include input data for the test. The input data of the test may include initiation data, configuration data, other data, or a combination thereof. The initiation data may include one or more instructions, commands, or parameters for initiating the test. The configuration data may indicate a test configuration for the test and may or may not include the code of the test. The code of the test may be executable code, scripted code, or other data of a test program or test harness. The test configuration may be based on settings of the computing device that executes the test and may include settings of the hardware (e.g., processor, memory, hard drive), settings of the programs (operating system, program versions, network addresses, user accounts), other settings, or a combination thereof. Test data 113 may be stored in version data store 110 and may be associated with a particular change set of code objects 112 as discussed in more detail in regards to FIG. 2.

Test data 113 may include data for different versions of the code object, as illustrated by test data 113A-C. Each of test data 113A-C may correspond to an execution of a test using different version of the code object. Each of the versions of the code object may be different but may contain an equivalent change set (e.g., same identical change set). For example, test data 113A may be for a test of a version of the code object on a bug fix branch, test data 113B may be for a test of a version of the code object on a team branch, and test data 113C may be for a test of a version of the code object on a main branch. In the example shown in FIG. 1, test data 113A-C may be combined (e.g., appended, concatenated, or merged). In other examples, each of test data 113A-C may be a different version of the test data and associated with the same change set. The different versions may each be kept separate or subsequent versions may include integrated content (e.g., third version includes content of the first two versions).

Versions 114 may be versions of the same code object or versions of one or more different code objects (e.g., a set of code objects). When multiple versions are associated with a common code object they may be referred to as related versions, corresponding versions, similar versions, associated versions, or other term. A version of a code object may include a change to object data that is not present in another version and multiple versions of the same code object may include a common change. The arrangement and differences between versions are discussed in more detail in regards to the tree data structure 300 of FIG. 3. In one example, each of versions 114 may be different and therefore absent any duplicate versions. In another example, one or more of the versions may be identical and have the same or similar object data 117. In either example, a different version of the code object may be generated in view of change data 115.

Change data 115 may include one or more change sets that can be applied to the code object to create a new version of the code object. Change data 115 may include changes to the content or metadata of the computing object. Change data 115 may include one or more instructions to perform the change (e.g., add, remove, modify) and the content affected by the change (e.g., new or old object content). Change data 115 is discussed in more detail in regards to FIG. 5 and may be applied to object data 117 to incorporate a change set into a new version of the code object. Change data 115 and object data 117 may be represented by object hashes 116 and delta hashes 118 respectively.

Object hashes 116 and delta hashes 118 are both examples of hash values that may be generated by one or more hash function and may represent portions of data. An object hash may represent object data of a particular version of a code object (e.g., output of a change) and a delta hash may represent change data of a particular change set that can be applied to a code object (e.g., the input change). The creation and use of object hashes 116 and delta hashes 118 are discussed in more detail in regards to hash function 220 of FIG. 3 and hash module 711 of FIG. 7. The hashes may be particularly useful because they may enable a computing device 120 to more efficiently detect equivalent change sets and associate them with the same test data 113.

Computing device 120 may include one or more physical or virtual computing devices that have access to a version data store 110 and provide a version control service to one or more client devices (e.g., nodes 130A-C). An example of computing device 120 is described in more details below with references to FIGS. 2, 5, 6 and 8. Computing device 120 may be a rack mounted server, workstation, desktop computer, notebook computer, tablet computer, mobile phone, palm-sized computing devices, personal digital assistants (PDAs), etc. The version control service provided by computing device 120 may process client requests to access particular versions of code object 112. Computing device 120 may integrate with one or more other services that generate, access, instantiate, deploy, or configure code objects 112. The version control service may be the same or similar to a Revision Control System (RCS), a Software Configuration Management system (SCM), a Source Code Control System (SCCS), a Version Control System (VCS), other system, or a combination thereof. In one example, the version control service may be the same or similar to GIT, Apache Subversion® (SVN), Concurrent Versions System (CVS®), Perforce®, AccuRev®, ClearCase®, Rational Team Concert®, Visual SourceSafe®, other product, or a combination thereof.

In the example shown in FIG. 1, computing device 120 may include a code object component 122 and a test component 124. Code object component 122 may enable computing device 120 to access one or more versions of code objects 112 that include a particular change set. Code object component 122 may enable computing device to build, configure, deploy, instantiate, or other operation to enable the code objects 112 to be tested. Test component 124 may enable computing device 120 to initiate a test of code objects 112 and to store output of the test (e.g., test data 113) in version data store 110. Test component 124 may also enable computing device 120 to associate test data 113 with the change set being tested. The associating may involve linking test data 113 with a particular change set, a particular version of the code object, or a combination thereof. Components 122 and 124 are discussed in more detail in regards to FIG. 2 and may use one or more nodes 130A-C to perform the features discussed herein.

Nodes 130A-C and computing device 120 may access version data store 110 using content addressable storage, location addressable storage, or a combination thereof. Content addressable storage (CAS) may be data storage that stores and retrieves elements based on the content of the element and not the storage location of the element. The identifiers used to retrieve elements may be the same or similar to object hashes 116 and may be a direct representation of the content of the version (e.g., object data). For example, a content addressable storage identifier may be a hash of one or more data blocks of the versioned code object and a modification of the content of the data blocks causes the hash to be recomputed. Content addressable storage may be a permanent-storage analogue to content-addressable memory and may be intended to store data that does not change or changes infrequently. When the stored elements remain unchanged, the content addressable storage may be referred to as Fixed Content Storage (FCS). In one example, version data store 110 may be a decentralized content addressable storage system that is the same or similar to the GIT distributed version control system and computing device 120 may access versions 114 using object hashes 116 as identifiers.

Location addressable storage is different from content addressable storage and may store and retrieve versions 114 based on location identifiers as opposed to content identifiers. The location identifier may identify a particular location where the versioned code object is being stored and may be independent from the content of the stored version. Whether the content is changed after it is stored may have no effect on the location identifier used to retrieve the stored version. A location identifier may identify a file based on a file name or storage path (e.g., relative or absolute path) or may identify a record based on a key (e.g., object identifier (MD)) and neither the file name, storage path, or key may be effected when the content of the file or record is changed.

Nodes 130A-C may provide coding resources that may create, modify, configure, execute, apply, instantiate, or deploy code objects 112 of version data store 110. In one example, nodes 130A-C may be separate from version data store 110 and may submit requests to access a code object and receive one or more versions of the code object. In another example, one or more of the nodes 130A-C may be integrated with the version data store 110 and may provide computing resources (e.g., storage or processing power) to operate the version data store 110.

Although nodes 130A-C comprise a computing device, the term "node" may refer to a physical machine, a virtual machine, container, or a combination thereof. Nodes 130A-B may provide one or more levels of virtualization and node 130C may be absent these levels of virtualization.

The one or more levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Node 130A node may provide hardware level virtualization by running a hypervisor 132 that provides hardware resources to one or more virtual machines 134. Hypervisor 132 may be any program or combination of programs and may run directly on the hardware (e.g., bare-metal hypervisor) or may run on or within a host operating system (not shown). The hypervisor may be the same as a virtual machine monitor and may manage and monitor various aspects of the operations of the computing device, including the storage, memory, and network interfaces. The hypervisor may abstract the physical layer hardware features such as processors, memory, and I/O devices, and present this abstraction as virtual devices to a virtual machine 134 executing a guest operating system 136.

Guest operating system 136 may be any program or combination of programs that are capable of managing computing resources of virtual machine 134 and/or node 130A. Guest operating system 136 may include a kernel comprising one or more kernel space programs (e.g., memory driver, network driver, file system driver) for interacting with virtual hardware devices or physical hardware devices. In one example, guest operating system 136 may include Linux®, Solaris®, Microsoft Windows®, Apple Mac®, other operating system, or a combination thereof.

Node 130B may be similar to node 130A and may provide operating system level virtualization by running a computer program that provides computing resources to one or more containers 131A-B. Operating system level virtualization may be implemented within the kernel of operating system 133 and may enable the existence of multiple isolated containers. In one example, operating system level virtualization may not require hardware support and may impose little to no overhead because programs within each of the containers may use the system calls of the same underlying operating system 133. This may enable node 130B to provide virtualization without the need to provide hardware emulation or be run in a virtual machine (e.g., intermediate layer) as may occur with hardware level virtualization. Operating system level virtualization may provide resource management features that isolate or limit the impact of one container (e.g., container 131A) on the resources of another container (e.g., container 131B).

The operating system level virtualization may provide a pool of computing resources that are accessible by container 131A and are isolated from one or more other containers (e.g., container 131B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 133 may include an operating system virtualizer that may provide containers 131A-B with access to computing resources. The operating system virtualizer may wrap one or more processes (e.g., of a particular service) in a complete file system that contains the code, runtime, system tools, system libraries, and other data present on the node (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 131A-B may refer to a resource-constrained process space of node 130C that can execute functionality of a program. Containers 131A-B may be referred to as a user-space instances, a virtualization engines (VE), or jails and may appear to a user as a standalone instance of the user space of operating system 133. Each of the containers 131A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 135 may be a data structure that is used to organize one or more containers 131A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same node 130B. In another example, the containers associated with a particular pod may be located on different nodes that are on the same or different physical machines.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
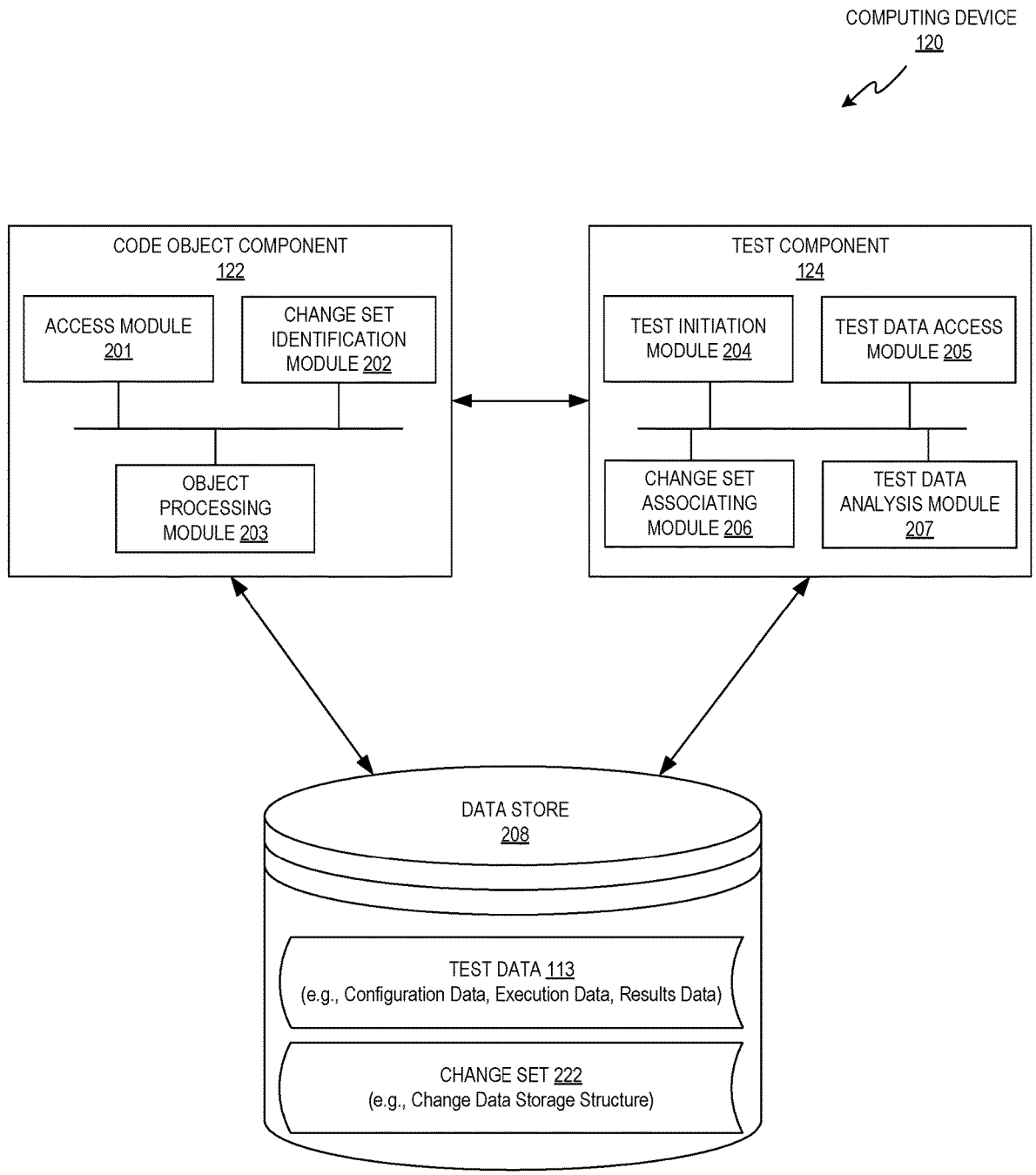
FIG. 2 depicts a block diagram of an example computing device with one or more components and modules for analyzing and comparing the different versions, in accordance with one or more aspects of the present disclosure.

FIG. 2 is a block diagram illustrating example components and modules that enable computing device 120 to store test data and associate the test data with one or more change sets, versions, code objects, or a combination thereof, in accordance with one or more aspects of the present disclosure. The components, modules, or features discussed in regards to computing device 120 may be consolidated to a single computing device or may be spread across one or more computing devices. The computing devices may be associated with a version control system service and may function as a client, a server, or a combination thereof. In the example shown in FIG. 2, computing device 120 may include a code object component 122 and a test component 124.

Code object component 122 may enable computing device 120 to access and prepare code objects for testing. In one example, code object component 122 may include an access module 201, a change set identification module 202, and an object processing module 203.

Access module 201 may include features for accessing a code object in a version data store. The version data store may store a plurality of versions of the code object. Each version may include content that has been added or removed from a prior or subsequent version. The versions may be organized via a tree data structure, which is discussed in more detail in regards to FIG. 3. Access module 201 may enable computing device 120 to transmit requests to version data store and to receive one or more versions of the code object.

Change set identification module 202 may identify a change set 222 associated with the code object. Change set 222 may be represented by a change set identifier (e.g., delta hash) that uniquely identifies the change set. A single change set 222 may be incorporated into a plurality of versions and the change set identifier (e.g., delta hash) may be different from version identifiers (e.g., object hashes). In one example, a code object may include source code and the change set may include at least one of an addition, a removal, or an update of a line of text of the source code.

Object processing module 203 may enable computing device 120 to process a code object and prepare the code object to be tested. Processing a code object may include one or more operations that involve compiling, linking, building, packaging, executing, running, launching, initiating, instantiating, deploying, other operation, or a combination thereof.

Test component 124 may enable computing device 120 to test the code object and store data of the test as a test data structure in the version data store. In one example, test component 124 may include a test initiation module 204, a test data access module 205, a change set associating module 206, and a test data analysis module 207.

Test initiation module 204 may enable computing device 120 to initiate a test of the code object. Initiating a test may involve executing an operation that begins testing the code object. The testing may be initiated by computing device 120 and may be executed on computing device 120, on another computing device (e.g., nodes 130A-C), or a combination thereof. Test initiation module 204 may select and/or configure a testing environment before, during, or after initiating the test. The test environment may include one or more computing devices (e.g., nodes 130A-C) and may be updated to incorporate a version of the code object being tested. In one example, the code object may be executable code and may be accessible to the computing device executing the test. In another example, the code object may be source code that is transformed (e.g., built and packaged) and the results of the transformation are accessible to the computing device executing the test.

Test data access module 205 may enable computing device 120 to access test data for the code object before, during, or after the test is executed. Test data 113 may be accessed from the computing device that executes the test or from a computing device that manages execution of the test. Test data access module 205 may communicate with the computing device or data storage device to retrieve configuration data for the test, execution data for the test, or a combination thereof. The configuration data (e.g., test initiation command, program settings) may function as input for the test and the execution data (e.g., system log) may function as output of the test. Test data access module 205 may also or alternatively access test data 113 from a data store. The data store may be the version data store or another data store coupled to the computing devices executing the test.

Test data access module 205 may store some or all of the test data 113 in the version data store. Test data 113 may be combined with test data from a prior or subsequent test execution on a different version of the code object. Combining the test data may involve appending, concatenating, merging, filtering, aggregating, summarizing, averaging, normalizing, or other operation. In one example, test data 113 may be stored as separate versions and each version of the test data may correspond to a particular execution of the test on the code object.

Change set associating module 206 may associate the test data in the version data store with a change set. The change set may include change data for updating the code object and may include both content data and position data. The content data may be the data (e.g., characters, data blocks) that are being updated (e.g., added, removed, replaced) and the position data may be the location in the code object that will be updated. The content data is included in at least one version of the code object but the position data is not included in any version of the code object (e.g., absent from all versions of the code object). In one example, test data 113 may be stored in version data store as one or more GIT notes that are associated to a particular change set (e.g., GIT commit).

Associating the change set with the test data may involve linking the change set to the test data in the version data store. The linking may involve one or more unidirectional links, bidirectional links, other links, or a combination thereof. Test data may be directly linked to the change set without being directly linked to any version that incorporates the change set. In one example, the change set may be represented by a hash of the change data (including position data) and the test data is linked to the hash of the change data. The hash of the change set (e.g., delta hash) is discussed in more detail in regards to FIG. 3 and FIG. 5.

Test data analysis module 207 may enable computing device 120 to analyze test data before, during, or after test data 113 is stored in the version data store. Analyzing test data 113 may be advantageous because test data 113 may indicate the tests that have been performed on a change set 222 and the results of the tests. This may indicate which test configurations have been tested and any prior passes or failures. Based on this data, test data analysis module 207 may select a test configuration that has not been tested or was previously tested with unfavorable results (e.g., failed or partially failed). In one example, test data analysis module 207 may detect that the change set is incorporated into a new version of the code object and analyze test data associated with the change set to determine an untested configuration and provide that to test initiation module 204 for a subsequent test.

Figure 3:
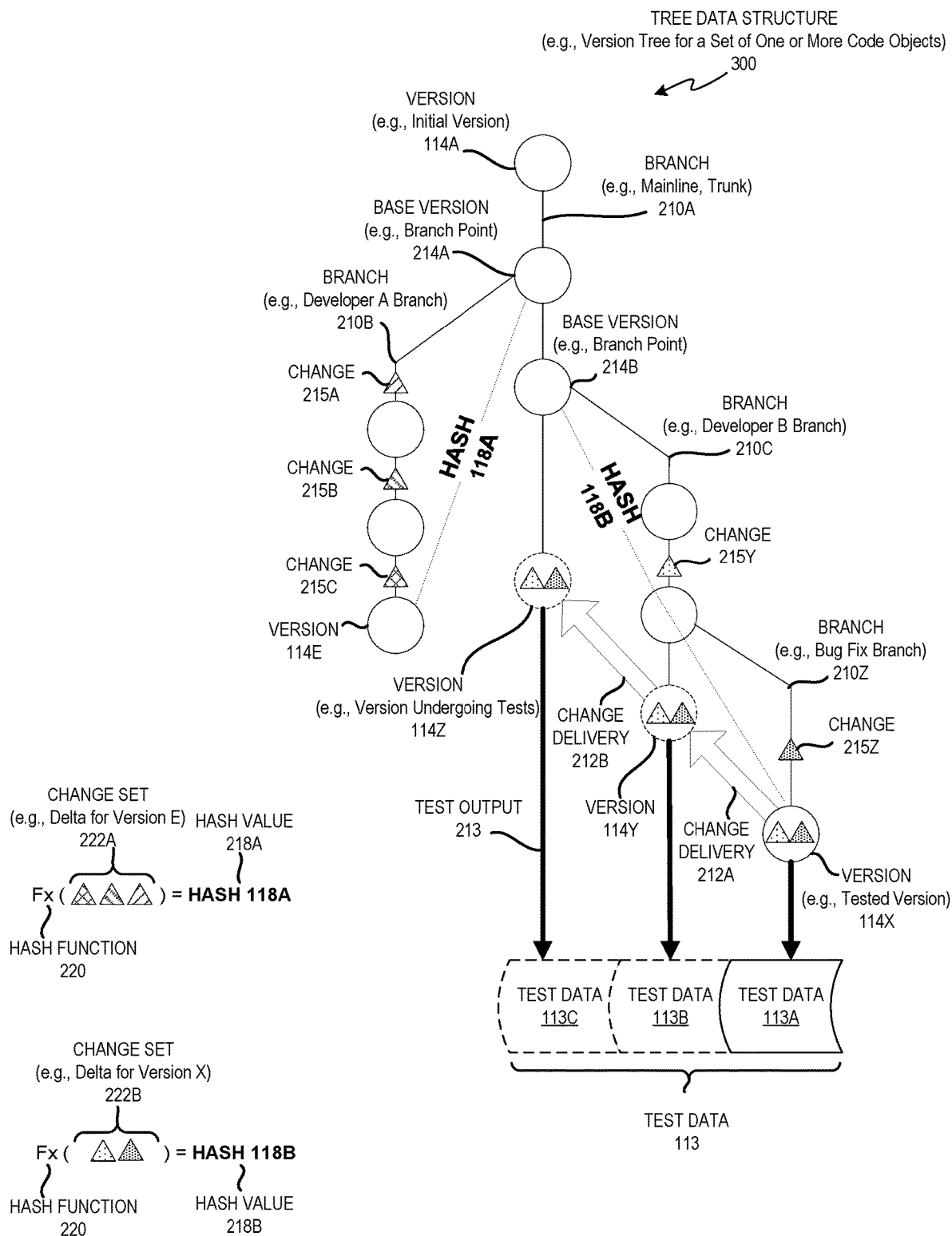
FIG. 3 depicts a block diagram of an example version tree that includes multiple versions, in accordance with one or more aspects of the present disclosure.

FIG. 3 is a line drawing illustrating an example tree data structure 300 for storing and organizing multiple versions of one or more code objects. Tree data structure 300 may be represented as a version tree that includes a set of nodes and a set of edges. The nodes may represent versions 114A-Z and the edges may represent changes 215A-Z. In one example, tree data structure 300 may represent versions of a single code object. In another example, tree data structure 300 may represent versions of a set of code objects and each version may represent the set at a point in time. A version of a set of code objects may correspond to a respective version of each code object in the set (e.g., object X-v3, object Y-v1, object Z-v5). The size of the set may expand or contract in subsequent versions of the set. In one example, the tree data structure 300 may represent a program and an initial version of the program may have an initial set of source code files and the quantity of files may increase or decrease in subsequent versions of the program. In another example, the tree data structure 300 may represent versions of a configuration for one or more computing devices (e.g., a set of deployed devices). An initial version of the configuration may correspond to a set of programs on a device or a set of executable images (e.g., different appliances) and the quantity of programs or executable images may increase or decrease in a subsequent version of the configuration. As used throughout this application, the term "code object" may be interpreted to include a "set of code objects" (e.g., one or more code objects) as discussed above and in either example, tree data structure 300 may organize the versions using one or more branches 210A-Z.

Branches 210A-Z may enable code objects to be changed in parallel by isolating changes on a first branch from changes on a second branch. Each of the branches 210A-Z may be the same or similar to a stream and may function as a parent branch, a child branch, or a combination thereof. A branch may be specific to a set of one or more topics (e.g., fixes or enhancements), users (e.g., developers, IT administrators), locations (e.g., geographically separated sites), entities (e.g., teams or companies), other separation, or a combination thereof. Branch 210A may be referred to as a main branch or trunk branch because it may be absent a parent branch and may not be based on any other branch. Branches 210B and 210C may both be child branches of parent branch 210A and each may be associated with a particular user (e.g., developer A and B respectively). Branch 210C may be both a child branch of branch 210A and a parent branch for branch 210Z. Branch 210Z may be created by the owner of the parent branch 210C (e.g., developer B) to isolate changes for a particular task (e.g., bug fix A). Each branch may branch out from any point on another branch and multiple branches may branch from the same point or different points. The point may be on the parent branch and may be a particular version. For example, branch 210B may branch from base version 214A on branch 210A and branch 210C may branch from base version 214B on branch 210A.

When comparing versions or changes in the tree data structure, computing device 120 may determine and analyze version relationship data to identify one or more base versions for the comparison. Version relationship data may represent the relationship of a version to one or more branches (e.g., child branch, parent branch, grandparent branch) and may indicate a base version for version or branch. The version relationship data may be derived by computing device 120 from tree data structure 300 and be stored in a data store 208 or version data store 110.

When comparing any two versions (e.g., target versions) the comparison operation may determine a common base version or the closest common base versions. For example, when comparing version 114E and 114Z the comparison operation may determine that base version 214A and 214B are the closest base versions because they are both on the same branch. In this instance, there may not be a single common base version because the branches branched off of different versions of the mainline. Identifying the one or more base versions may be advantageous because there may be differences between versions that are unimportant and based on earlier decisions and using the base versions to remove those changes enables the version comparison to distinguish changes. In general, changes that are made on a particular branch may be compared but may remain isolated to the particular branch until they are delivered to one or more other branches, as illustrated by change deliveries 212A-B.

Change deliveries 212A-B may deliver changes between branches of tree data structure 300. Each of change deliveries 212A-B may integrate the changes that occurred on a source branch to a destination branch. The integration may involve creating a new version on the destination branch that will include changes from the source branch. The integration may involve one or more operations that include copying, moving, merging, removing, adding, other operation, or a combination thereof. The changes that occur on the source branch and the destination branch prior to the delivery may affect the complexity of the change delivery.

Change delivery 212A may be an example of a less complex delivery and may deliver changes made on source branch 210Z (e.g., bug fix branch) to destination branch 210C (e.g., developer branch). There may have been no changes applied to destination branch 210C since the base version 214B of source branch 210C. Therefore, change 215Z may be delivered from source branch 210Z to destination branch 210C by making a copy of version 114Z onto destination branch 210B without reapplying change 215Z to a version on branch 210C or merging object data of two different versions.

Change delivery 212B may be an example of a more complex delivery because changes were made on destination branch 210A after the branch base version 214B of source branch 210C. As such, change delivery 212B may need to merge changes of source branch 210C with changes of destination branch 210A. In either example, each of change deliveries 212A-B may create a new version at a destination branch that may be tested and each of the new versions may include a common change (e.g., a common change set).

Testing each version of the code object may result in test data being stored in a version data store and associated with the corresponding change set. As shown in FIG. 3, versions 114X-Z may all include a common change set (e.g., change 215Y and 215Z) and may each version may be tested before, during, or after a change delivery. For example, the testing of version 114X may be associated with test data 113A, the testing of version 114Y may be associated with test data 113B, and the testing of version 114Z may be associated with test data 113C (as illustrated by test output 213). The testing of versions 114X-Z may be done sequentially, in parallel, or a combination thereof. In a traditional scenario, the same test with the same test configuration may be used when testing each version and the test results may be discarded. This may result in duplicate tests being performed on the same change set. By storing the test data in the version data store, it may be accessible before performing a subsequent test and may enable the test execution device to use a different test configuration so that the repeated tests are more comprehensive (e.g., cover more variations). Test data 113 may be linked to hashes 118A-B because both may correspond to the same set of changes (e.g., changes 215A-C are equivalent to changes 215Y-Z even though they may be provided by different users).

Hash 118A and hash 118B may each be a bit sequence that can represent the content of a set of changes. Hashes 118A-B may be the same or similar to delta hashes 118 of FIG. 1 and hashes of different change sets may have the same or different lengths. In one example, all the delta hashes may have the same length (e.g., N bits) and the length of the hash may be independent of the set of changes. In another example, the delta hashes may have different lengths and the length may be based on the size (e.g., storage size), complexity (e.g., entropy, variations), or other property of the change data of the respective change set. Different change sets may include the same changes (e.g., change data) and the hashes may be compared to determine that the different change sets include the same changes to the code object. For example, when hashes 118A-B match (e.g., identical bit sequence) it may indicate that the corresponding sets of changes (e.g., 222A and 222B) have the same changes even though they may be made by different users on different branches at different times (e.g., same content but different metadata) as such them may be linked to the same test data 113.

Hashes 118A and 118B may each be derived from the change data of a respective set of changes and may be used to distinguish the content of different sets of changes. The data of a change (e.g., change data) is often much smaller than the data of a version that incorporates the change (e.g., object data). Each of hashes 118A-B may be based on a respective sets of changes that were applied to a code object and each respective set may be associated with one or more versions. For example, a change set 222A may include three different changes 215A-C that are illustrated as three delta symbols and change set 222B may include a two changes illustrated by two delta symbol. The combination of each change set may be identical and may be provided as input to hash function 220.

Hash function 220 may include one or more functions that can be used to map data of arbitrary size to data of a particular size. The particular size may be an absolute size (e.g., fixed size of N bits), a relative size (e.g., percentage of input data size), other size, or a combination thereof. The values calculated by the hash function may be referred to as hash values, hash codes, digests, or simply hashes. Hash function 220 may be a hash function that enables a computing device to easily identify and compare data represented by the hash. A property of a cryptographic hash is that it may be used to verify that received input data maps to a given hash value, but if the input data is unknown it may be deliberately difficult to reconstruct it by knowing the stored hash value. This property may enhance the ability of the computing device to determine the data of the corresponding. In one example, the hash function may be a cryptographic hash function that is the same or similar to Secure Hash Algorithm (e.g., SHA-2, SHA-3, SHA-n) but in other examples it may be another cryptographic hash function (e.g., MD5, MDC-2) or a non-cryptographic hash function (e.g., checksum, Cyclic Redundancy check (CRC)).

Hashes 118A-B may in addition or alternatively be based on one or more delta hashes and/or an object hashes. In one example, hashes 118A-B may be based on the delta hash of one or more other changes, set of changes, or a combination thereof. In another example, hashes 118A-B may also be based on an object hash that identifies a particular code object or version of the code object.

Hashes 118A-B may be incorporated into a hash data structure that is associated with tree data structure 300. The hash data structure may be incorporated into tree data structure 300 or separate from tree data structure 300 (e.g., a separate structure linked to the tree data structure). The hash data structure may be a hash tree (e.g., Merkle tree), a hash list, a hash chain, other data structure, or a combination thereof. The hash tree may be a tree data structure with one or more leaf nodes and one or more non-leaf nodes. One or more of the leaf nodes (e.g., every leaf node) may be associated with the hash of a data block of an object or a set of objects. One or more of the non-leaf nodes (e.g., every non-leaf node) may be associated with the hash of one or more of the hashes of its child nodes (e.g., a hash of a hash). The hash tree may be referred to as a tree of hashes and the leaf nodes may include hashes of object data blocks and non-leaf nodes may include hashes of the hashes of respective child nodes. When a non-leaf node has multiple child nodes, the subsequent hash (e.g., hash of a hash) may involve concatenating one or more hash values. The concatenation may occur before applying the subsequent hash or after applying the subsequent hash. For example, the hash values of two leaf nodes may each be hashed and the results concatenated or may be concatenated and the result hashed. In either example, the resulting hash of a hash may be associated with one or more parent nodes of the leaf nodes. The same hash function or different hash functions may be used for the hashing of the data block and the hashing of the hash values. The creation and use of hashes 118A and 118B are discussed in more detail in regards to FIG. 5.

Figure 4:
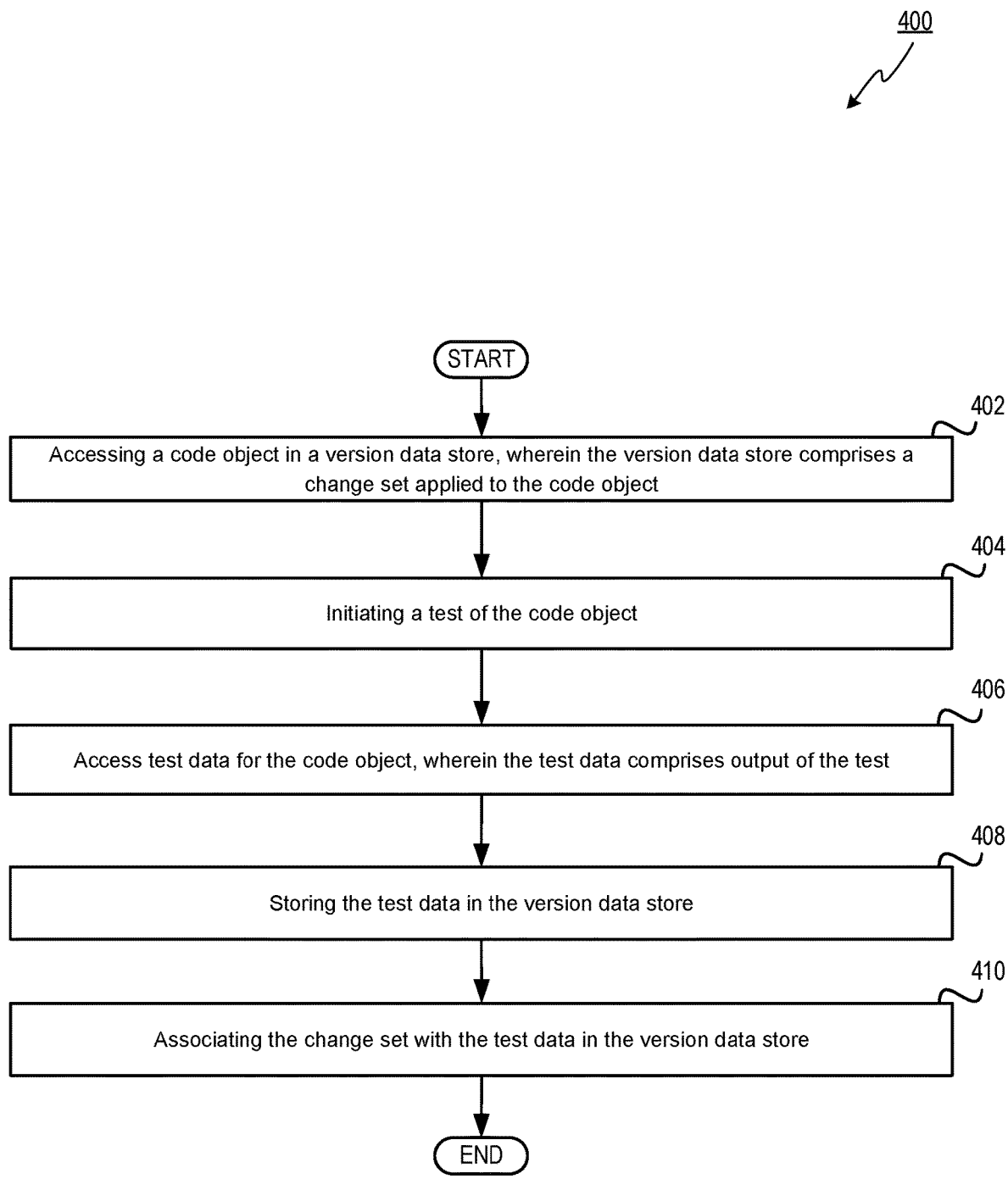
FIG. 4 depicts a flow diagram of an example method for storing test data and associating the test data with a change set, in accordance with one or more aspects of the present disclosure.

FIG. 4 depicts a flow diagram of one illustrative example of a method 400 for testing a code object and storing and associating the test data with one or more change sets, versions, code objects, or a combination thereof, in accordance with one or more aspects of the present disclosure. Method 400 and each of its individual functions, routines, subroutines, or operations may be performed by one or more processors of a computing device executing the method. In certain implementations, method 400 may be performed by a single computing device. Alternatively, methods 400 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by components 122 and 124 as shown in FIGS. 1 and 2.

Method 400 may be performed by processing devices of a server device or a client device and may begin at block 402. At block 402, a processing device may access a code object in a version data store, wherein the version data store comprises a change set applied to the code object. The code object may include source code and the change set may include at least one of an addition, a removal, or an update of a line of text of the source code. The change set may be a data structure that includes change data for updating the code object. The change data may include content data added to at least one version of the code object and position data that indicates a location in the code object to add the content data. The position data may be included in the change set structure but may be absent from any or all versions of the code object. In one example, the change set may be represented by a hash of the change data and the hash may be linked with the test data.

At block 404, the processing device may initiate a test of the code object. Initiating a test may involve the processing device executing an operation that begins testing of the code object in a testing environment. The processing device may select or configure the testing environment before, during, or after initiating the test. The test environment may include one or more computing devices (e.g., nodes 130A-C) and may be updated to incorporate a version of the code object being tested. In one example, the processing device may detect that the change set is incorporated into a new version of the code object and may analyze test data associated with the change set to determine an untested configuration. The processing device may then initiate a test of the new version of the code object on the untested configuration.

At block 406, the processing device may access test data for the code object and the test data may include output of the test. The processing device may access the test data from a computing device executing the test, a computing device managing the execution of the test or from a data storage device that stores output of the test (e.g., log server). The test data may also or alternatively include execution data and configuration data for the test of the code object. The execution data may be output of the test and the configuration data may be input for the test.

At block 408, the processing device may store the test data in the version data store. The version data store may be the same version data store that includes the code object being tested or may be a different version data store. In either example, the version data store may include multiple versions of the test data that are associated with the change set. The multiple versions of the test data may include a first version that includes output of the test on a first test configuration, a second version that includes output of the test on a second test configuration, and a third version that includes a combination of the outputs from the tests on the first and second test configurations.

At block 410, the processing device may associate the change set with the test data in the version data store. Associating the change set with the test data may involve linking the test data to the change set. The code object may include a plurality of versions arranged on a plurality of branches and the change set may be incorporated into versions on at least two of the plurality of branches. The test data may be linked to the change set and associated with each version that incorporates the change set without being directly linked to the individual versions. Responsive to completing the operations described herein above with references to block 410, the method may terminate.

Figure 5:
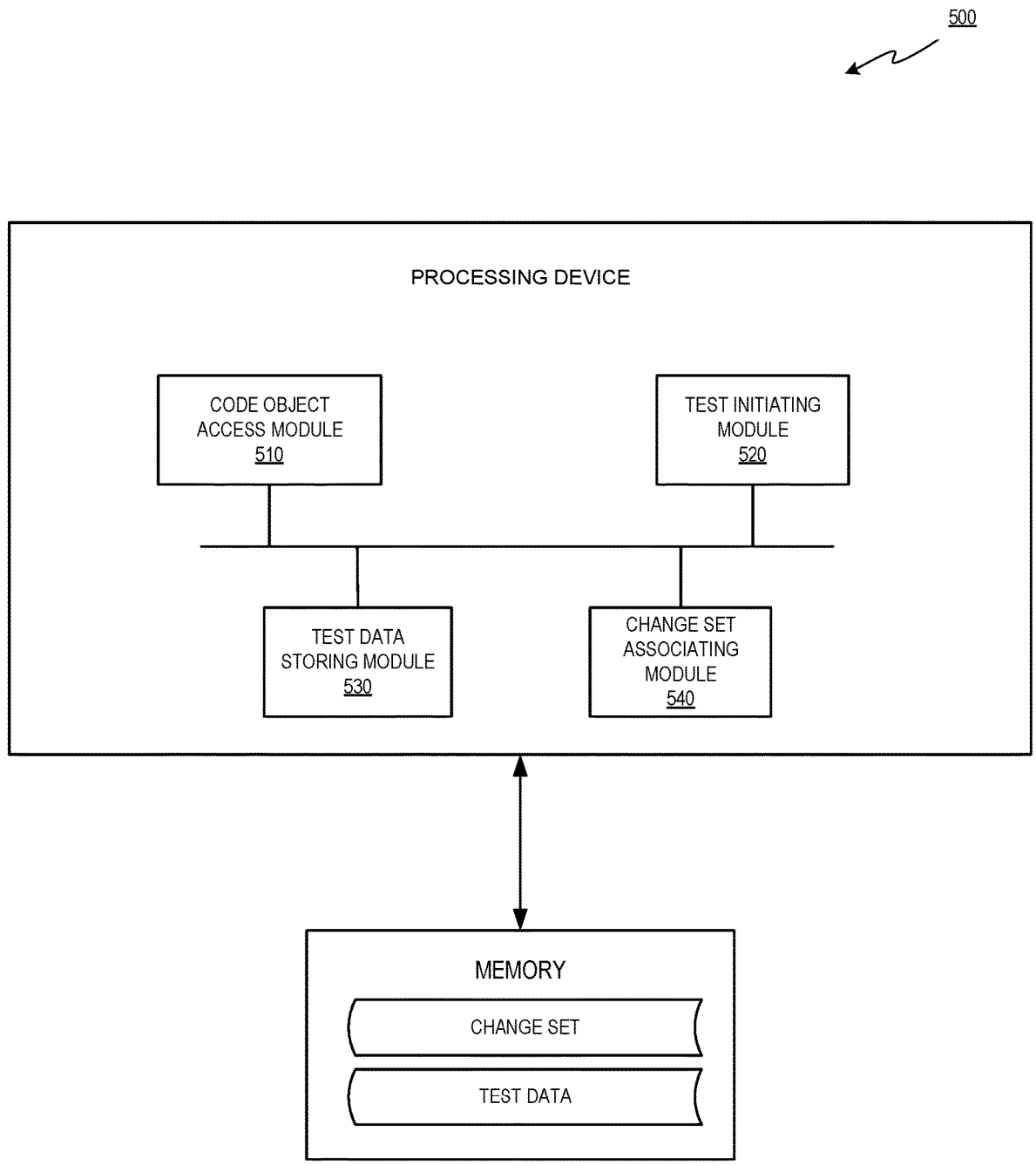
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computer system 800 and may include one or more processing devices and one or more memory devices. In the example shown, computer system 500 may include a code object access module 510, a test initiating module 520, a test data storing module 530, and a change set associating module 540.

Code object access module 510 may enable a processing device to access a code object in a version data store, wherein the version data store comprises a change set applied to the code object. The code object may include source code and the change set may include at least one of an addition, a removal, or an update of a line of text of the source code. The change set may be a data structure that includes change data for updating the code object. The change data may include content data added to at least one version of the code object and position data that indicates a location in the code object to add the content data. The position data may be included in the change set structure but may be absent from any or all versions of the code object. In one example, the change set may be represented by a hash of the change data and the hash may be linked with the test data.

Test initiating module 520 may enable the processing device to initiate a test of the code object. Initiating a test may involve the processing device executing an operation that begins testing of the code object in a testing environment. The processing device may select or configure the testing environment before, during, or after initiating the test. The test environment may include one or more computing devices (e.g., nodes 130A-C) and may be updated to incorporate a version of the code object being tested. In one example, the processing device may detect that the change set is incorporated into a new version of the code object and may analyze test data associated with the change set to determine an untested configuration. The processing device may then initiate a test of the new version of the code object on the untested configuration.

Test data storing module 530 may enable the processing device to access and store test data for the code object. The test data may include output of the test and the processing device may access the test data from a computing device executing the test, a computing device managing the execution of the test or from a data storage device that stores output of the test (e.g., log server). The test data may also or alternatively include execution data and configuration data for the test of the code object. The execution data may be output of the test and the configuration data may be input for the test. The processing device may store the test data in the version data store and the version data store may be the same version data store that includes the code object being tested or may be a different version data store. In either example, the version data store may include multiple versions of the test data that are associated with the change set. The multiple versions of the test data may include a first version that includes output of the test on a first test configuration, a second version that includes output of the test on a second test configuration, and a third version that includes a combination of the outputs from the tests on the first and second test configurations.

Change set associating module 540 may enable the processing device to associate the change set with the test data in the version data store. Associating the change set with the test data may involve linking the test data to the change set. The code object may include a plurality of versions arranged on a plurality of branches and the change set may be incorporated into versions on at least two of the plurality of branches. The test data may be linked to the change set and associated with each version that incorporates the change set without being directly linked to the individual versions.

Figure 6:
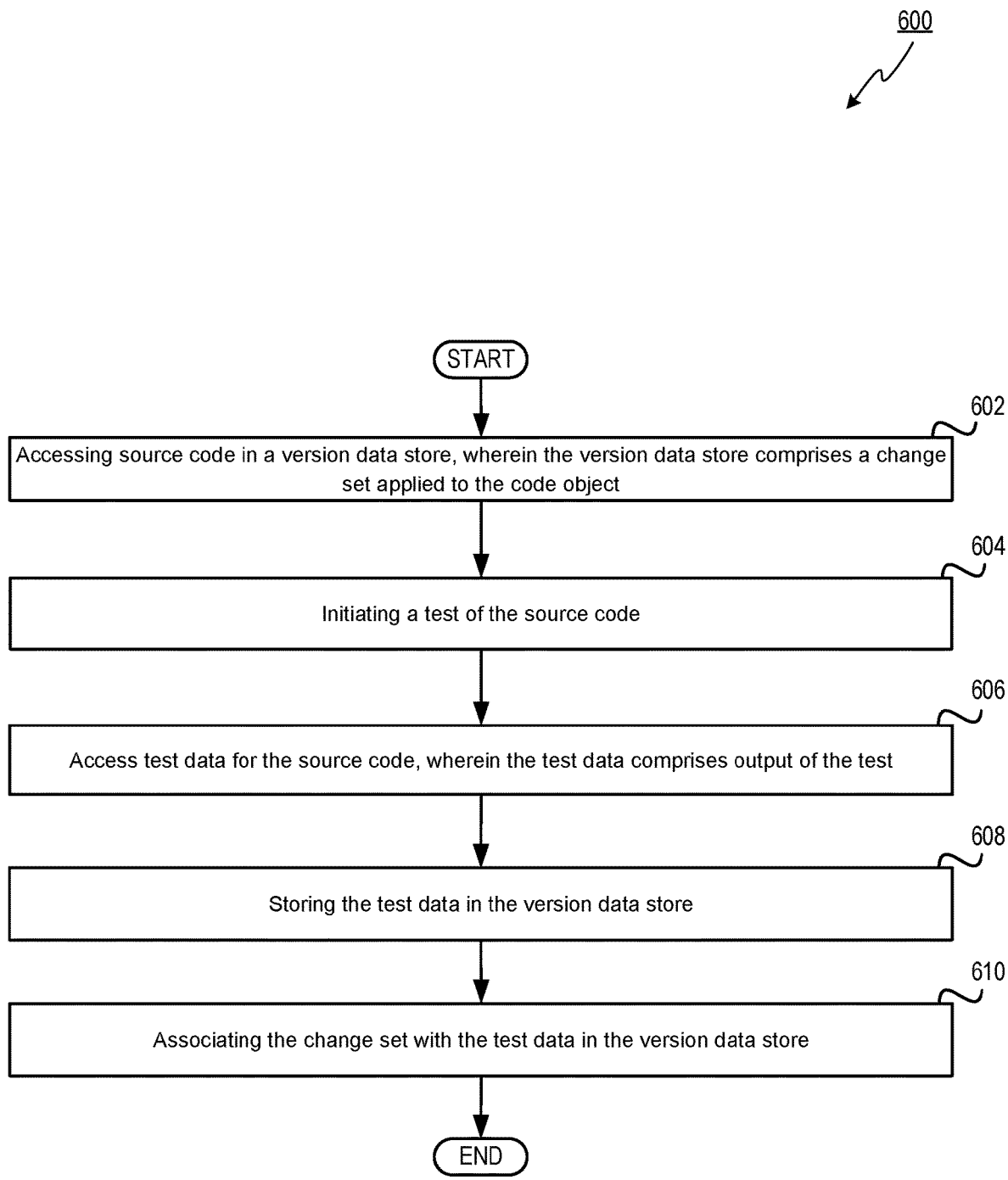
FIG. 6 depicts a flow diagram of another example method for storing test data and associating the test data with a change set, in accordance with one or more aspects of the present disclosure.

FIG. 6 depicts a flow diagram of one illustrative example of a method 600 for storing test data and associating the test data with a change set for source code, in accordance with one or more aspects of the present disclosure. Method 600 may be similar to method 400 and each of its individual functions, routines, subroutines, or operations may be performed by one or more processors of the computing device executing the method. Method 600 may be performed by processing devices of a server device or a client device and may begin at block 602.

At block 602, a processing device may access source code in a version data store, wherein the version data store comprises a change set applied to the source code. The change set may include at least one of an addition, a removal, or an update of a line of text of the source code. The change set may be a data structure that includes change data for updating the source code. The change data may include content data added to at least one version of the source code and position data that indicates a location in the source code to add the content data. The position data may be included in the change set structure but may be absent from any or all versions of the source code. In one example, the change set may be represented by a hash of the change data and the hash may be linked with the test data.

At block 604, the processing device may initiate a test of the source code. Initiating a test may involve the processing device executing an operation that begins testing of the source code in a testing environment. The processing device may select or configure the testing environment before, during, or after initiating the test. The test environment may include one or more computing devices (e.g., nodes 130A-C) and may be updated to incorporate a version of the source code being tested. In one example, the processing device may detect that the change set is incorporated into a new version of the source code and may analyze test data associated with the change set to determine an untested configuration. The processing device may then initiate a test of the new version of the source code on the untested configuration.

At block 606, the processing device may access test data for the source code and the test data may include output of the test. The processing device may access the test data from a computing device executing the test, a computing device managing the execution of the test or from a data storage device that stores output of the test (e.g., log server). The test data may also or alternatively include execution data and configuration data for the test of the source code. The execution data may be output of the test and the configuration data may be input for the test.

At block 608, the processing device may store the test data in the version data store. The version data store may be the same version data store that includes the source code being tested or may be a different version data store. In either example, the version data store may include multiple versions of the test data that are associated with the change set. The multiple versions of the test data may include a first version that includes output of the test on a first test configuration, a second version that includes output of the test on a second test configuration, and a third version that includes a combination of the outputs from the tests on the first and second test configurations.

At block 610, the processing device may associate the change set with the test data in the version data store. Associating the change set with the test data may involve linking the test data to the change set. The source code may include a plurality of versions arranged on a plurality of branches and the change set may be incorporated into versions on at least two of the plurality of branches. The test data may be linked to the change set and associated with each version that incorporates the change set without being directly linked to the individual versions. Responsive to completing the operations described herein above with references to block 610, the method may terminate.

Figure 7:
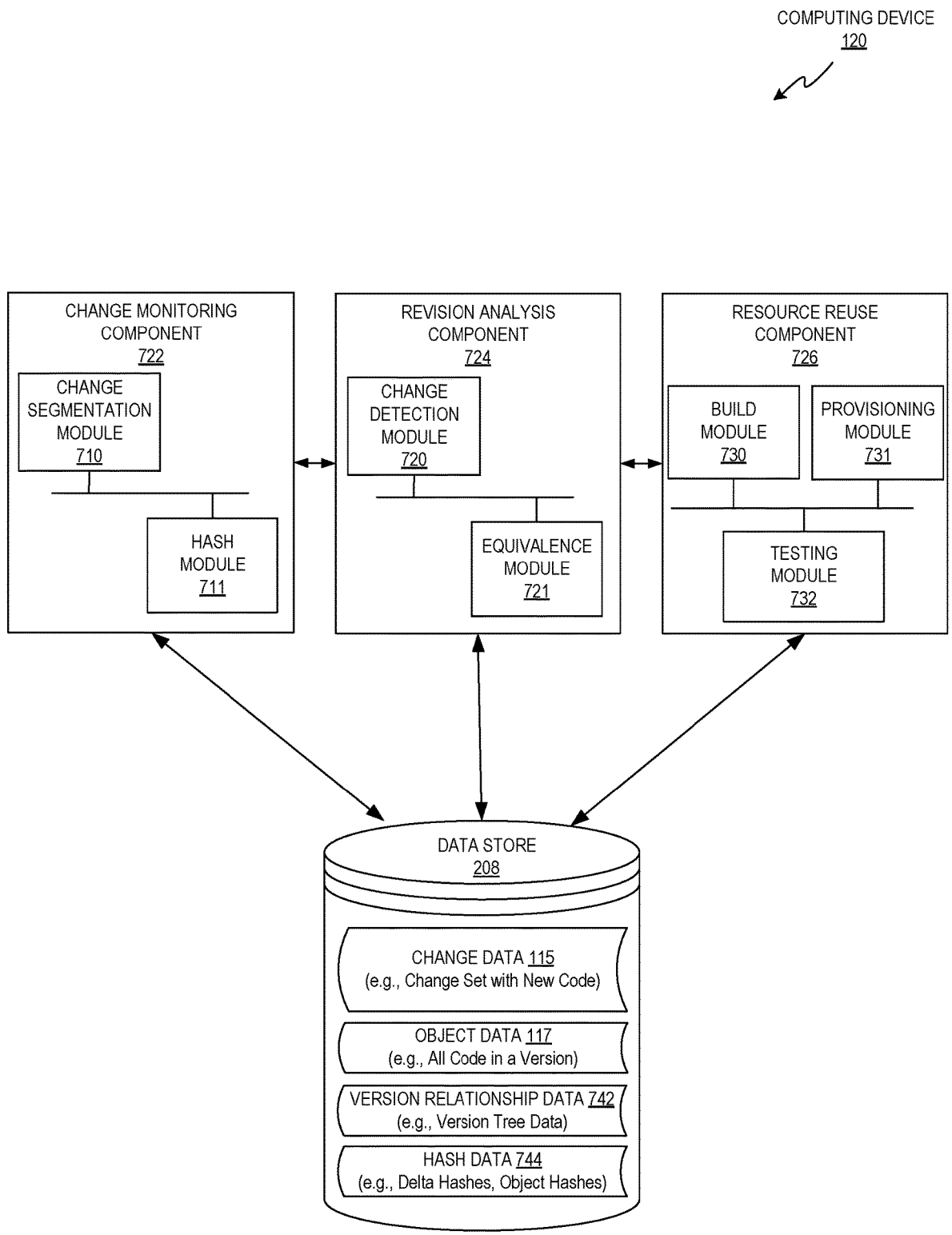
FIG. 7 depicts a block diagram of an example computing device with one or more components and modules for detecting equivalent change sets that can be associated to the same test data, in accordance with one or more aspects of the present disclosure.

FIG. 7 is a block diagram illustrating example components and modules that enable computing device 120 to detect equivalent changes in different versions of one or more code objects which may enable the changes to be linked to the same test data, in accordance with one or more aspects of the present disclosure. The components, modules, or features discussed in regards to computing device 120 may be consolidated to the computing device 120 or be spread across one or more computing devices. In the example shown in FIG. 7, computing device 120 may further include change monitoring component 722, a revision analysis component 724, and a resource reuse component 726.

Change monitoring component 722 may analyze changes that effect one or more code objects. A code object may include a plurality of versions and include different types of data. In one example, the code object may include source code and the set of changes may include an addition, removal, or update of a line of text of the source code. In another example, the code object may include executable code and the set of changes may include an addition, removal, or modification of executable data of the executable code. The set of changes for one version may be made or provided by a first device and the set of changes of another version may be made or provided by a second device. The first and second devices may be different development devices (e.g., developer workstation, build machine), provisioning devices (e.g., configuration server, deployment server), other device, or a combination thereof. Change monitoring component 722 may analyze changes before, during, or after the changes are input by a user, applied to a version of the code object, received by the version data store, used to create a new version, delivered between branches, detected by a user initiated version comparison, other operation, or a combination thereof. In one example, change monitoring component 722 may include a change segmentation module 710 and a hash module 711.

Change segmentation module 710 may enable computing device 120 to determine a set of changes of a version of a code object or a version of a set of code objects. The set of changes may be applied to a code object to create the version or may be applied to the version to create another version. The changes may be tracked, aggregated, extracted, correlated, redacted, filtered, or a combination thereof and then stored in data store 208 as change data 115. Change data 115 may be in a human readable form or non-human readable form and may include position data and content data for one or more changes. The position data may indicate one or more positions in the code object that are affected by the change. The position data may identify a location in a file (e.g., line number, word count, character offset), location in a database (e.g., registry key, record number), block identifier (e.g., image offset), other position data, or a combination thereof. The content data may include data to be added or removed from the code object (e.g., new line or removed line) and/or instructions on how to cause the change (e.g., move, delete, append, concatenate, merge). The content data may include the content being added, deleted, moved, or replaced and may relate to lines of code, configuration values, data blocks of an image, other content, or a combination thereof.

Change segmentation module 710 may determine the change data of a set of changes by monitoring incoming changes or by comparing different versions. Change segmentation module 710 may monitor changes by listening, requesting, receiving, or accessing one or more incoming or outgoing changes before, during, or after they are applied to a code object. In one example, determining the changes may involve detecting the changes when they are provided by a user (e.g., as developer input or IT administrator input). In another example, determining the changes may involve detecting the changes when they are provided to the version data storage and applied to an existing version or incorporate into a new version of the code object.

Change segmentation module 710 may also or alternatively determine the set of changes by comparing exiting versions of a code object. Comparing the versions may involve performing a comparison of textual data, graphic data, executable data, other data, or a combination thereof. In one example, the comparison may involve performing a textual comparison between versions of the code object to identify textual differences of a body of text (e.g., source code, configuration file). The textual comparison may be performed at any level of granularity and may be performed between one or more characters, words, lines, paragraphs, pages, files, other level, or a combination thereof. The textual differences may include one or more additions, deletions, moves, copies, font changes, formatting changes, other textual transformation, or a combination hereof. In another example, the comparison may involve performing a binary comparison between versions of the code object to identify binary differences. The binary comparison may be performed at any level of granularity and may be performed between one or more bits, bytes, packets, sectors, blocks, records, files, directories, other level, or a combination thereof. The differences may include on or more data additions, deletions, moves, copies, other data transformation, or a combination thereof. As discussed above, the comparison may or may not take into account the base versions or a common base version when performing the comparison to determine the change set.

Changes may occur in a continuous or discrete manner and change segmentation module 710 may segment the changes into sets based on one or more factors. How the changes are segmented into sets effects the data being hashed and if the same identical changes are segmented differently it may change the resulting hashes and cause the hashes to indicate the changes are not equivalent. The factors that may be used to segment the changes into sets may be based on users, devices, branches, deliveries, time periods, versions, code objects, portion of a code objects, other factors, or a combination thereof. In one example, changes that are applied to a code object to create a new version may be aggregated together as a set of changes and each new version will correspond to a different change set. In another example, all changes applied to a code object on a branch may be aggregated into a single change set even though the branch includes multiple versions. In a further example, the changes that are delivered from source branch to a target branch may be aggregated into a change set and each delivery may correspond to a change set. There are many other examples of how to segment changes into a set of changes. The segmenting may be the same or similar to aggregating, grouping, arranging, classifying, clustering, cataloging, categorizing, other term, or a combination thereof. Once the change set is identified the change data associated with the change set may be processed by hash module 711.

Hash module 711 may analyze change data 115 and generate one or more delta hashes. Hash data 744 may include one or more delta hashes and may also or alternatively include one or more object hashes. Each of the hash may correspond to one or more sets of changes, versions, code objects, or a combination thereof. Hash module 711 may enable computing device 120 to generate a delta hash in view of change data 115 and store the delta hash in data store 208 as hash data 744. Each delta hash may represent a particular set of changes that are applied or will be applied to one or more code objects. Hash module 711 may access the portion of change data 115 associated with a set of changes (e.g., one or more changes) and derive a delta hash from the portion of change data 115.

Hash module 711 may identify change data for multiple changes in the set of changes and each change may correspond to position data and content data. Hash module 711 may combine the position data and content data for each of the changes before, during, or after it is hashed. For example, the hash module may combine the individual data items and hash the resulting combination or may hash the individual data items and combine the resulting hashes, or a combination thereof. The combining may involve concatenating, appending, merging, integrating, extracting, redacting, other operation, or a combination thereof. Hash module 711 may provide the combined change data for the set of changes as input to the hash function. The hash function may include one or more mathematical transformations that are applied to the change data and may output a hash value. The hash value may be a bit sequence that is treated as a delta hash and may be added to hash data 744 in data store 208. When the hash function is a cryptographic hash function the output hash value may be a cryptographic hash value (e.g., cryptographic bit sequence). In one example, hash module 711 may incorporate the hashes into the tree data structure 300 of FIG. 2.

Revision analysis component 724 may enable computing device 120 to determine whether different versions include equivalent sets of changes. The determination may be done in response to an event initiated by a user or a device. The event may relate to a save, commit, check-in, deliver, comparison, build, deploy, provisioning, configuration, other operation, or a combination thereof. In one example, a user may initiate revision analysis component 724 by initiating a delivery or by comparing specific versions, branches, code objects, or a combination thereof. In another example, revision analysis component 724 may be initiated by a device as part of a continuous integration platform. In either example, revision analysis component 724 may access, analyze, and/or update hash data 744, change data 115, object data 117, version relationship data 742, other data, or a combination thereof. In one example, revision analysis component 724 may include a change detection module 720 and an equivalence module 721.

Change detection module 720 may identify changes included in versions of a code object or set of code objects. Change detection module 720 may begin by resolving the input to revision analysis component 724 to one or more target versions. The target versions may be referred to as source version, a destination version, or a combination thereof and may be from the same or different branches. Change detection module 720 may identify a first target version based on input and then identify a second target version in view of the input, the first target version, or a combination thereof. In one example, the input may attempt to run the most recent version (e.g., current version) and change detection module 720 may identify the second target version based on which version was previously run. Running a version may involve building, packaging, instantiating, deploying, executing, or a combination thereof. The previously run version may be an earlier version on the same branch or on a different branch (e.g., base version from parent branch). In another example, the input may initiate a change delivery for a first version and change detection module 720 may access version relationship data to identify the source branch of the first version and a destination branch (e.g., parent branch, grandparent branch, sibling branch or other branch). For each target version, the change detection module 720 may access one or more delta hashes that represent one or more sets of changes that have been incorporated into the respective version. The delta hashes may be used by equivalence module 721.

Equivalence module 721 may use hashes to compare the first target version with the second target version to determine whether the versions are equivalent or whether they contain an equivalent change. Using hashes to compare versions may be more efficient than the textual or binary comparisons discussed above. Equivalence module 721 may use the delta hashes, object hashes, other hashes, or a combination thereof when comparing the target versions. A comparison that uses delta hashes may be more effective than a comparison based on object hashes alone. This is because the object hashes may be based on metadata and identical changes may have been applied to the same identical code object but because the changes were applied by different users or at different times the object hashes may be different. Therefore, the object hashes may indicate the versions are different yet an analysis of the delta hashes may indicate the versions include equivalent changes and are equivalent.

Equivalence module 721 may access the delta hashes associated with each of the versions and compare them. Comparing delta hashes may involve performing a bit by bit comparison of a first hash and a second hash. Equivalence module 721 may perform the comparison before, during, or after performing a trimming, truncating, cleaning, or other operation. Each version may be associated with one or more sets of changes and may be associated with a set of one or more delta hashes (e.g., one for each set of changes). Comparing sets of delta hashes may involve performing comparisons between individual delta hashes in the set and may involve executing one or more sorting optimizations before, during, or after the comparisons. When at least one of the delta hashes match, the equivalence module 721 may determine there is a common change set present in both versions (e.g., bug fix A). When all of the delta hashes in the first set match all of the delta hashes in the second set then equivalence module 721 may indicate the first version and the second versions are equivalent. This may indicate they include equivalent change sets even though the different versions of the code object may not be identical (e.g., different object data).

Equivalence module 721 may provide an indication that the first and second version include at least one set of changes that are equivalent. In one example, providing an indication may involve transmitting a signal or message that indicates the set of changes of the first version are included in the second version of the coding object. In another example, providing an indication may involve updating stored data (e.g., shared storage, the compared versions, or field of code object) to indicate the set of changes of the first version are included in the second version of the coding object. In either example, equivalence module 721 may provide the indication to resource reuse component 726.

Resource reuse component 726 may detect that the versions are equivalent and associate coding resources that were associated with the first version to the second version. The coding resources may be shared between different versions of the one or more code objects. The sharing may occur concurringly and the coding resources associated with the first version may also be associated with the second version at the same time. The sharing may also or alternatively occur sequentially and the coding resources associated with the first version may be disassociated with the first version before, during, or after associating the coding resources with the second version (e.g., after first version finishes or when second version is run). The coding resources may be computing resources that include threads, processes, devices, other resource or the output thereof. The coding resources may relate to building, configuration, provisioning, deploying, testing, or other operations related to a version of a code object. In one example, resource reuse component 726 may include a build module 730, a provisioning module 731 and a testing module 732.

Build module 730 may enable a build entity or build output to be shared by multiple versions of a code object. The build entity may be a thread, process, module, machine, or other entity that may take a version of a code object as input and creates build output. The build output may include one or more binary files, executables, configuration files, programs, packages, executable images (e.g., container image, VM image, or disk image), other output, or a combination thereof. The build entity may process or transform the code object using one or more operations that involve compiling, linking, interpreting, other transformation, or a combination thereof.

Provisioning module 731 may enable a provisioning entity or provisioning output to be shared by multiple versions of a code object. The provisioning entity may be a thread, process, module, machine, or other entity that takes a version of a code object as input and provides provisioning output. The provisioning output may include an instance of one or more threads, processes, containers, virtual machines, or device that are provisioned for use with the code object. Provisioning module 731 may interact with a provisioning client or a provisioning server to configure and deploy a code object on a physical computing machine (e.g., host machine).

Testing module 732 may enable a test entity or test output to be shared by multiple versions of a code object. The test entity may be a thread, process, module, machine, or other entity that takes a version of a code object as input and creates test output. The test entity may perform static analysis, runtime analysis, other analysis, or a combination thereof. The test entity may analyze the code object with or without executing data of the code object or derived from the code object. The test output may include text (e.g., command line output), graphics (e.g., screen shots, charts), reports, executables, other output, or a combination thereof.

Figure 8:
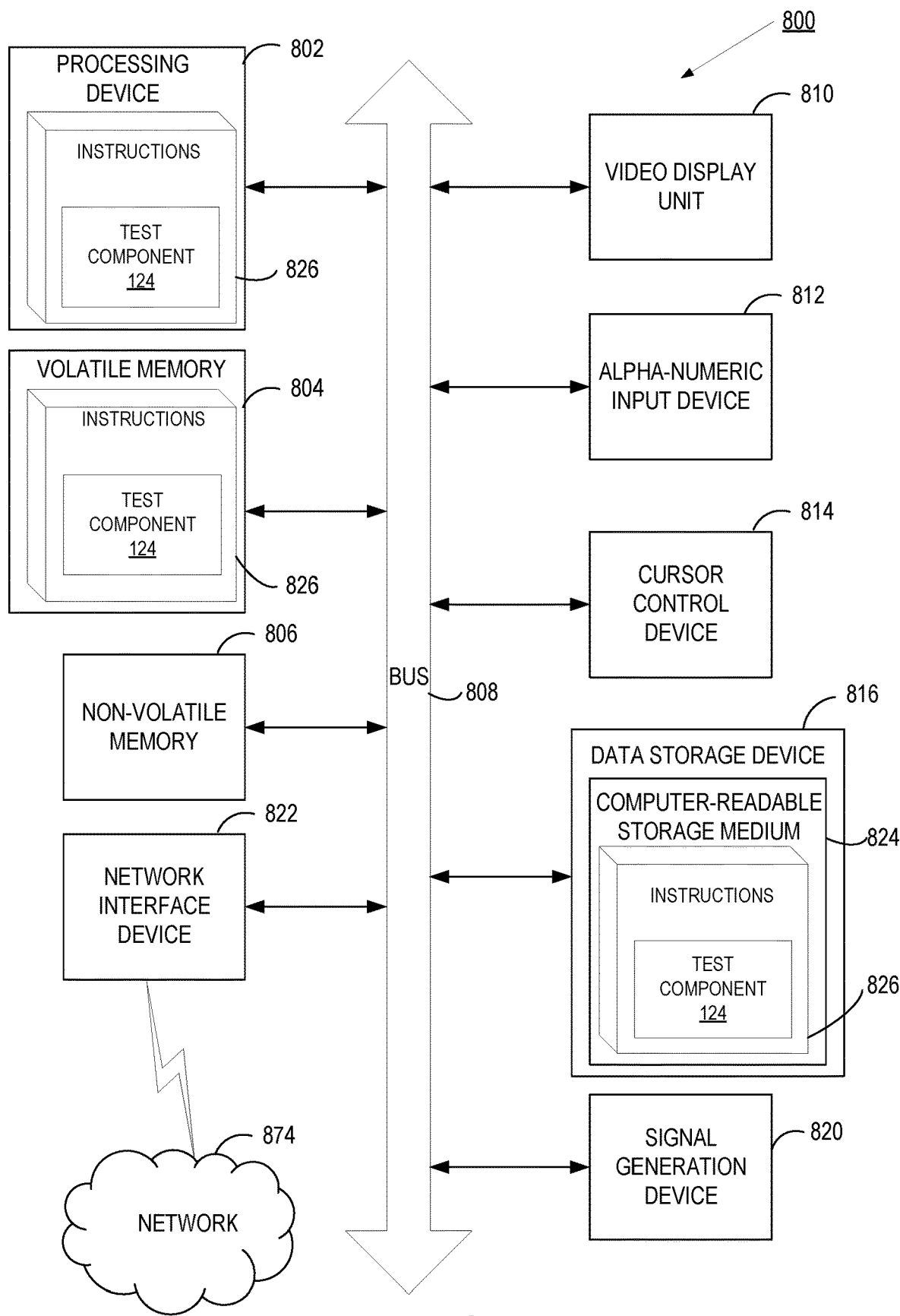
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computing device 120 or one or more of the nodes 130A-Z of FIG. 1. Computer system 800 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 400 or 600 and for encoding test component 124 of FIGS. 1 and 2.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "generating," "accessing," "comparing," "indicating," "analyzing," "detecting," "providing," "transmitting," "updating," "enhancing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 600 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
  accessing a code object in a version data store, wherein the version data store comprises a change set applied to the code object, wherein the code object comprises a plurality of versions arranged on a plurality of branches, and wherein the change set is incorporated into versions of the code object on at least two of the plurality of branches;
  initiating a test of the code object;

accessing test data for the code object, wherein the test data comprises output of the test;
storing the test data in the version data store;
associating the change set with the test data in the version data store;
detecting that the change set is incorporated into a new version of the code object;
analyzing the test data associated with the change set to determine a testing configuration that has not yet been tested;
initiating a test of the new version of the code object on the untested configuration; and
provisioning one or more virtual machine instances with the new version of the code object.

2. The method of claim 1, wherein the code object comprises source code and wherein the change set comprises at least one of an addition, a removal, or an update of a line of text of the source code.

3. The method of claim 1, wherein the test data in the version data store comprises configuration data and execution data for the test of the code object, wherein the configuration data comprises input for the test and the execution data comprises output of the test.

4. The method of claim 1, wherein associating the change set with the test data comprises linking the change set to the test data in the version data store, wherein the test data is linked to the change set and is associated with each version that incorporates the change set.

5. The method of claim 1, wherein the change set comprises change data for updating the code object, wherein the change data comprises content data added to at least one version of the code object and position data that indicates a location in the code object to add the content data.

6. The method of claim 5, wherein the change set is represented by a hash of the change data and the hash of the change data is linked with the test data.

7. The method of claim 1, wherein the version data store comprises multiple versions of the test data that is associated with the change set, the multiple versions comprising a version comprising a first output of the test on a first test configuration, a version comprising a second output of the test on a second test configuration, and a version comprising a combination of the first output and the second output.

8. A system comprising:
a memory; and
a processing device communicably coupled to the memory, the processing device to:
access a code object in a version data store, wherein the version data store comprises a change set applied to the code object, wherein the code object comprises a plurality of versions arranged on a plurality of branches, and wherein the change set is incorporated into versions on at least two of the plurality of branches;
initiate a test of the code object;
access test data for the code object, wherein the test data comprises output of the test;
store the test data in the version data store;
associate the change set with the test data in the version data store;
detect that the change set is incorporated into a new version of the code object;
analyze the test data associated with the change set to determine a testing configuration that has not yet been tested;
initiate a test of the new version of the code object on the untested configuration; and
provision one or more virtual machine instances with the new version of the code object.

9. The system of claim 8, wherein the code object comprises source code and wherein the change set comprises at least one of an addition, a removal, or an update of a line of text of the source code.

10. The system of claim 8, wherein the test data in the version data store comprises configuration data and execution data for the test of the code object, wherein the configuration data comprises input for the test and the execution data comprises output of the test.

11. The system of claim 8, wherein to associate the change set with the test data the processing device is to link the change set to the test data in the version data store, wherein the test data is linked to the change set and is associated with each version that incorporates the change set.

12. A non-transitory machine-readable storage medium comprising instructions that cause a processing device to:
access source code in a version data store, wherein the version data store comprises a change set applied to the source code, wherein the source code comprises a plurality of versions arranged on a plurality of branches, and wherein the change set is incorporated into versions on at least two of the plurality of branches;
initiate a test of the source code;
access test data for the source code, wherein the test data comprises output of the test;
store the test data in the version data store;
associate the change set with the test data in the version data store;
detect that the change set is incorporated into a new version of the source code;
analyze the test data associated with the change set to determine a testing configuration that has not yet been tested;
initiate a test of the new version of the source code on the untested configuration; and
provision one or more virtual machine instances with the new version of the source code.

13. The non-transitory machine-readable storage medium of claim 12, wherein the test data in the version data store comprises configuration data and execution data for the test of the source object, wherein the configuration data comprises input for the test and the execution data comprises output of the test.

14. The non-transitory machine-readable storage medium of claim 12, wherein associating the change set with the test data comprises linking the change set to the test data in the version data store, wherein the test data is linked to the change set and is associated with each version that incorporates the change set.

15. The non-transitory machine-readable storage medium of claim 12, wherein the change set comprises change data for updating the source code, wherein the change data comprises content data added to at least one version of the source code and position data that indicates a location in the source code to add the content data.

16. The non-transitory machine-readable storage medium of claim 15, wherein the change set is represented by a hash of the change data and the hash of the change data is linked with the test data.

* * * * *